US010196073B2

(12) United States Patent
Pruessmeier

(10) Patent No.: US 10,196,073 B2
(45) Date of Patent: Feb. 5, 2019

(54) LINEAR TRANSPORT SYSTEM AND METHOD FOR OPERATING THE LINEAR TRANSPORT SYSTEM

(71) Applicant: BECKHOFF AUTOMATION GMBH, Verl (DE)

(72) Inventor: Uwe Pruessmeier, Lemgo (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 223 days.

(21) Appl. No.: 15/211,301

(22) Filed: Jul. 15, 2016

(65) Prior Publication Data
US 2016/0325761 A1 Nov. 10, 2016

Related U.S. Application Data

(63) Continuation of application No. PCT/EP2015/050564, filed on Jan. 14, 2015.

(30) Foreign Application Priority Data

Jan. 21, 2014 (DE) .................. 10 2014 100 636

(51) Int. Cl.
B61B 3/02 (2006.01)
B60L 5/08 (2006.01)
(Continued)

(52) U.S. Cl.
CPC .................. *B61B 3/02* (2013.01); *B60L 5/08* (2013.01); *B60L 5/38* (2013.01); *H02K 41/031* (2013.01); *H02K 7/108* (2013.01)

(58) Field of Classification Search
CPC .. B61B 3/00; B61B 3/02; B61B 13/00; B61L 1/00; B61L 1/02; E01B 25/00; E01B 25/08; E01B 25/22
See application file for complete search history.

(56) References Cited

U.S. PATENT DOCUMENTS

2006/0099843 A1 5/2006 Fullner et al.

FOREIGN PATENT DOCUMENTS

CN 103004100 A 3/2013
DE 122795 C 8/1901
(Continued)

OTHER PUBLICATIONS

International Search Report for International Patent Application No. PCT/EP2015/050564, dated Nov. 25, 2015 (4 pages).
(Continued)

Primary Examiner — Robert J McCarry, Jr.
(74) Attorney, Agent, or Firm — Dorsey & Whitney LLP

(57) ABSTRACT

A linear transport system comprises at least one carriage which has at least one permanent magnet and at least one roller, an energizable stator device which has multiple coils, and a guide rail which is arranged on the stator device and which serves for guiding the carriage. The guide rail comprises a running surface for the rolling of the roller of the carriage, such that the roller can roll on the running surface during a displacement, guided by way of the guide rail, of the carriage, wherein at least one electrical contacting device is provided which is formed separately from the roller and which is designed to form an electrical connection between the carriage and the guide rail during the displacement, guided by way of the guide rail, of the carriage.

22 Claims, 13 Drawing Sheets

(51) Int. Cl.
*B60L 5/38* (2006.01)
*H02K 41/03* (2006.01)
*H02K 7/108* (2006.01)

(56) References Cited

FOREIGN PATENT DOCUMENTS

| DE | 929959 C | 7/1955 | |
|---|---|---|---|
| DE | 2045659 A1 | 3/1972 | |
| DE | 3006354 C2 | 5/1984 | |
| DE | 19908922 A1 | 9/2000 | |
| DE | 10013222 A1 | 10/2001 | |
| DE | 102012103378 A1 | 10/2013 | |
| DE | 102012204916 A1 | 10/2013 | |
| JP | H08324790 | * 12/1996 | ............... B07C 5/36 |
| JP | H08324790 A | 12/1996 | |
| WO | 0168500 A1 | 9/2001 | |

OTHER PUBLICATIONS

English translation of Chinese Office Action for Chinese Patent Application No. 201580007654X, dated Jun. 13, 2018 (6 pages).

* cited by examiner

LINEAR TRANSPORT SYSTEM AND METHOD FOR OPERATING THE LINEAR TRANSPORT SYSTEM

CROSS-REFERENCE TO RELATED APPLICATIONS

This application is a continuation of PCT application PCT/EP2015/050564, filed Jan. 14, 2015, entitled "Linear Transport System and Method for Operating the Linear Transport System," which claims priority to German Patent Application No. DE 10 2014 100 636.4, filed Jan. 21, 2014, each of which is incorporated by reference herein, in the entirety and for all purposes.

FIELD

The invention relates to a linear transport system and to a method for operating a linear transport system of said type.

BACKGROUND

Transport systems such as are known from the prior art, for example from DE 10 2012 103 378 A1, generally comprise a linear motor which can drive a carriage. Here, the carriage generally runs, by way of a roller, along or in a guide rail. In the case of non-conductive materials being used for the guide rail or for the roller, electrical charge carriers that collect on the surface of the carriage during a displacement of the carriage cannot flow off to the guide rail. This thus means in particular that the carriage can become electrically charged in relation to its surroundings. This effect is similar to that in a belt-type generator, which can also be referred to as a Van-de-Graaf generator.

Since the carriage generally forms a Faraday cage for the rollers of the carriage, the electrostatic charge of the carriage during the displacement thereof is thereby intensified yet further.

Owing to the electrostatic charge, a spark discharge can occur between the carriage and its surroundings. This can lead to electrical malfunctions. In particular, an operator can suffer an electric shock. In particular, the risk of a fire can be increased.

SUMMARY

The invention relates to a linear transport system and a method for operating the linear transport system, which can reduce or prevent an electrostatic charge of a carriage in the linear transport system.

According to one aspect a linear transport system comprises at least one carriage which has at least one permanent magnet and at least one roller, an energizable stator device which has multiple coils, and a guide rail which is arranged on the stator device and which serves for guiding the carriage. The guide rail comprises a running surface for the rolling of the roller of the carriage, such that the roller can roll on the running surface during a displacement, guided by way of the guide rail, of the carriage, wherein at least one electrical contacting device is provided which is formed separately from the roller and which is designed to form an electrical connection between the carriage and the guide rail during the displacement, guided by way of the guide rail, of the carriage.

According to a further aspect, a linear transport system comprises at least one carriage which has at least one permanent magnet and multiple rollers, an energizable stator device which has multiple coils, a guide rail which is arranged on the stator device and which serves for guiding the carriage. The guide rail comprises running surfaces for the rolling of the rollers of the carriage, such that the rollers can roll on the running surfaces during a displacement, guided by way of the guide rail, of the carriage, an electrically conductive contact surface which is electrically connected to the guide rail, and at least one electrical contacting device which is formed separately from the roller and which is designed to form an electrical connection between the carriage and the guide rail during the displacement, guided by way of the guide rail, of the carriage. The electrical contacting device comprises at least one electrically conductive component which is arranged on the carriage and which is electrically connected to the carriage and which is designed to make electrical contact with the contact surface during the guided displacement, wherein a contact point of the component with the contact surface during the guided displacement is situated opposite the geometric center of a polygonal region whose corners are formed in each case by a central point of the respective spindles of the rollers.

According to a further aspect, a method operates a linear transport system. During a displacement, guided by way of a guide rail, of a carriage comprising rollers, an electrical contacting device forms an electrical connection between the carriage and the guide rail, wherein the electrical contacting device comprises at least one electrically conductive component which is arranged on the carriage and which is electrically connected to the carriage and which is designed to make electrical contact with the contact surface during the guided displacement. A contact point of the component with a contact surface of a guide rail during the guided displacement is situated opposite the geometric center of a polygonal region whose corners are formed in each case by a central point of the respective spindles of the rollers of a carriage.

The invention is explained in more detail below using figures, in which, in a schematic illustration in each case:

DETAILED DESCRIPTION

Below, the same reference designations can be used for identical features. Furthermore, for the sake of clarity, the figures do not always show the reference designations for all features.

Figure 1:
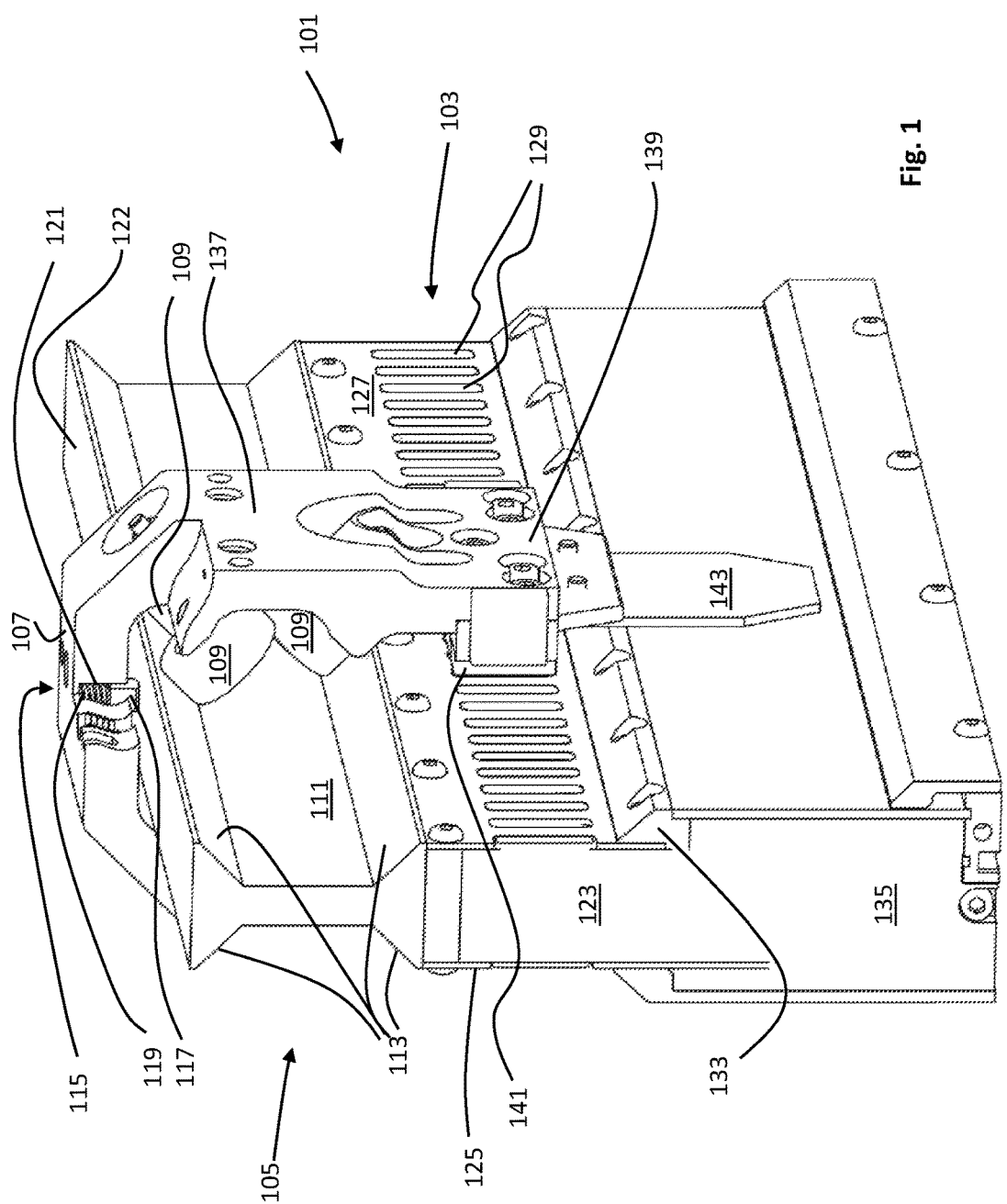
FIG. 1 shows a transport system.

FIG. 1 shows a transport system 101.

The transport system 101 comprises a linear motor 103. Furthermore, the transport system 101 comprises a transport device 105.

The transport device 105 has a carriage 107, which has a total of six rollers 109. Owing to the perspective view in FIG. 1, only three rollers 109 are visible.

Furthermore, the transport device 105 comprises a guide rail 111 which is in the form of an I-shaped profile element. The guide rail 111 comprises four running surfaces 113 for the six rollers 109. The rollers 109 can roll on said running surfaces 113 when the carriage 107 is displaced along the guide rail 111.

Furthermore, the transport device 105 comprises an electrical contacting device 115 which is formed separately from the rollers 109. Said electrical contacting device 115 is designed to form an electrical connection between the carriage 107 and the guide rail 111 during the displacement, guided by way of the guide rail 111, of the carriage 107.

For this purpose, the contacting device 115 comprises an electrically conductive component 117. A spring 119 is provided between the electrically conductive component 117 and the carriage 107. Said spring exerts a spring force on the component 117, such that the component 117 is pressed against a contact surface 122 by way of the spring force during the guidance. The contact surface 122 is in the form of a surface of the profile element 111. The spring 119 is received in a recess 121, wherein the recess 121 is formed on the carriage 107. The recess 121 guides the spring 119 and the component 117.

In an embodiment, provision may be made for the electrically conductive component 117 to be an antistatic brush. The brush hairs and/or the brush fibers of the antistatic brush make contact with the contact surface 122 during the guidance.

Furthermore, the linear motor 103 comprises a stator device 123. The stator device 123 comprises a first circuit board 125 and a second circuit board 127, which are arranged parallel to and opposite one another. The two circuit boards 125 and 127 have multiple cutouts 129. Here, a respective cutout of the first circuit board 125 is formed opposite a respective cutout 129 of the second circuit board 127. This thus means in particular that the cutouts 129 of the two circuit boards 125 and 127 are arranged in each case opposite one another.

Multiple coils are arranged between the two circuit boards 125 and 127 of the stator device 123. The coils are each wound around a stator tooth which is fitted into two opposite cutouts 129 of the two circuit boards 125 and 127. Electrical contacting of the coils is realized by way of at least one of the two circuit boards 125 and 127, in particular by way of both circuit boards 125 and 127. This thus means in particular that the coils are electrically contacted with the two circuit boards 125 and 127.

Below the cutouts 129, that is to say below the coils, there is provided a profile element 133 which runs parallel to the profile element, that is to say parallel to the guide rail 111.

Below the profile element 133, there is formed a carrier profile element 135, with the profile element 133 being arranged on or fastened to said carrier profile element. This thus means in particular that the carrier profile element 135 bears the stator device 123. In an embodiment, provision may be made for the profile element 133 and the carrier profile element 135 to be formed as a common profile element. The carrier profile element 135 may for example have a cavity into which the two circuit boards 125 and 127 project, wherein power electronics and/or position detection electronics of a position detection system may be arranged in said cavity, also referred to as installation space.

The linear motor 103 furthermore comprises two permanent magnets 141. These are arranged on the carriage 107. The carriage 107 has a U shape or C shape. The carriage thus comprises two limbs 137 which are arranged parallel to one another. On a respective end 139 of the lens 137 there is arranged in each case one permanent magnet 141. Thus, a respective permanent magnet 141 is arranged opposite the stator device 123, in this case in particular opposite the coils, when the carriage 107 is placed onto the guide rail 111.

This thus means in particular that, in this case, that is to say when the carriage 107 is placed onto the guide rail 111, one of the permanent magnets 141 is situated on the right, and the other situated on the left, adjacent to the corresponding circuit boards 125, 127. Here, a spacing is provided between the permanent magnets 141 and the corresponding circuit boards 125 and 127. Thus, in each case one gap is formed between a permanent magnet 141 and the corresponding circuit board 125 or 127. Such an arrangement can thus also be referred to as a dual gap arrangement.

In an embodiment, it is also possible for multiple permanent magnets 141 to be provided, which are arranged, in each case to the left and to the right of the corresponding circuit boards 125 and 127, on the end 139 of the limb 137.

Furthermore, a single position detection element 143 is provided which is arranged on one end 139 of the two limbs 137. Said position detection element 143 runs, as an extension, downward away from the carriage 107 in the direction of the carrier profile element 135, and is thus, when the carriage 107 is placed onto the guide rail 111, arranged opposite position detection system electronics that may be provided. The position detection system electronics are designed in particular to detect the presence of the position detection element 143 such that, in this way, it is advantageously possible for a position of the carriage 107 to be determined. From the measured signals, it is then possible for a position of the carriage 107 to be calculated, in particular at another location, for example by way of a superordinate controller.

Figure 2:
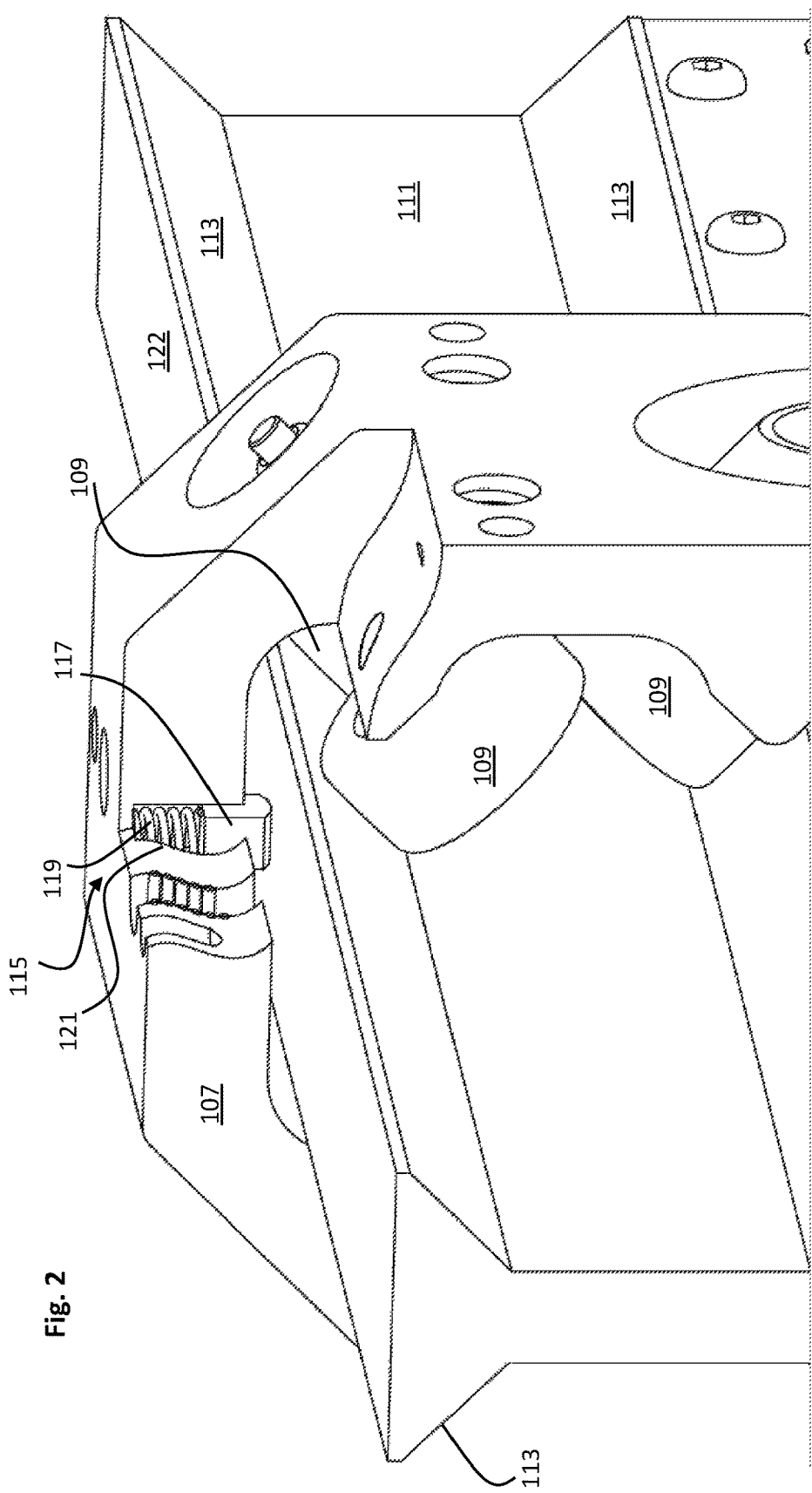
FIG. 2 shows an enlarged detail view of the transport system as per FIG. 1.

FIG. 2 shows an enlarged detail view of the transport system 101 as per FIG. 1.

On an enlarged scale, the figure shows in particular the upper region of the carriage 107 with the electrically conductive component 117. The spring 119 presses the electrically conductive component 117 in the direction of the contact surface 122 at all times during the displacement of the carriage 107. It is thus advantageously possible for a reliable electrical connection between the carriage 107 and the guide rail 111 to be realized. This is the case even if a spacing between the carriage 107 and the contact surface 122 changes owing to vibrations.

Owing to the electrical connection between the carriage 107 and the guide rail 111, it is possible for electrical charges which form on a surface of the carriage 107 during the displacement to flow off to the guide rail 111 via the electrically conductive component 117. An electrostatic charge of the carriage can thus advantageously be reduced or even prevented. This can advantageously prevent a sparkover between the carriage 107 and the guide rail 111. In this way, it is furthermore possible for damage to electrical components, an electrical malfunction of electrical components, a risk to a user or a risk of fire to be reduced or eliminated. The electrically conductive component 117 acts analogously to a lightning conductor or to a ground connection.

Figure 8:
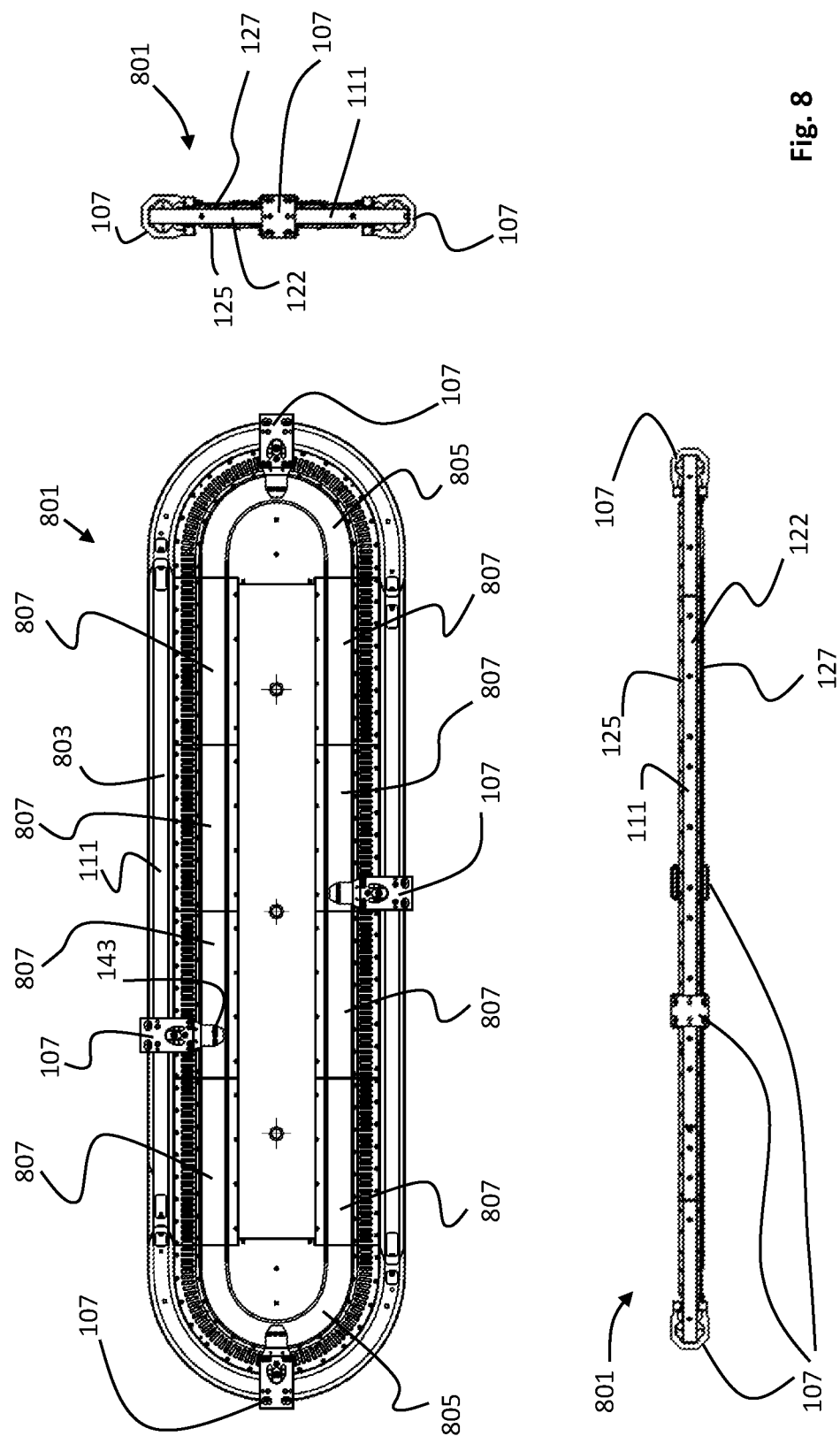
FIG. 8 shows yet another transport system.

The linear motor 103 described above is in particular described further in the two German patent applications DE 10 2012 204 916.9 and DE 10 2012 204 919.3, in particular in conjunction with FIG. 8.

Figure 3:
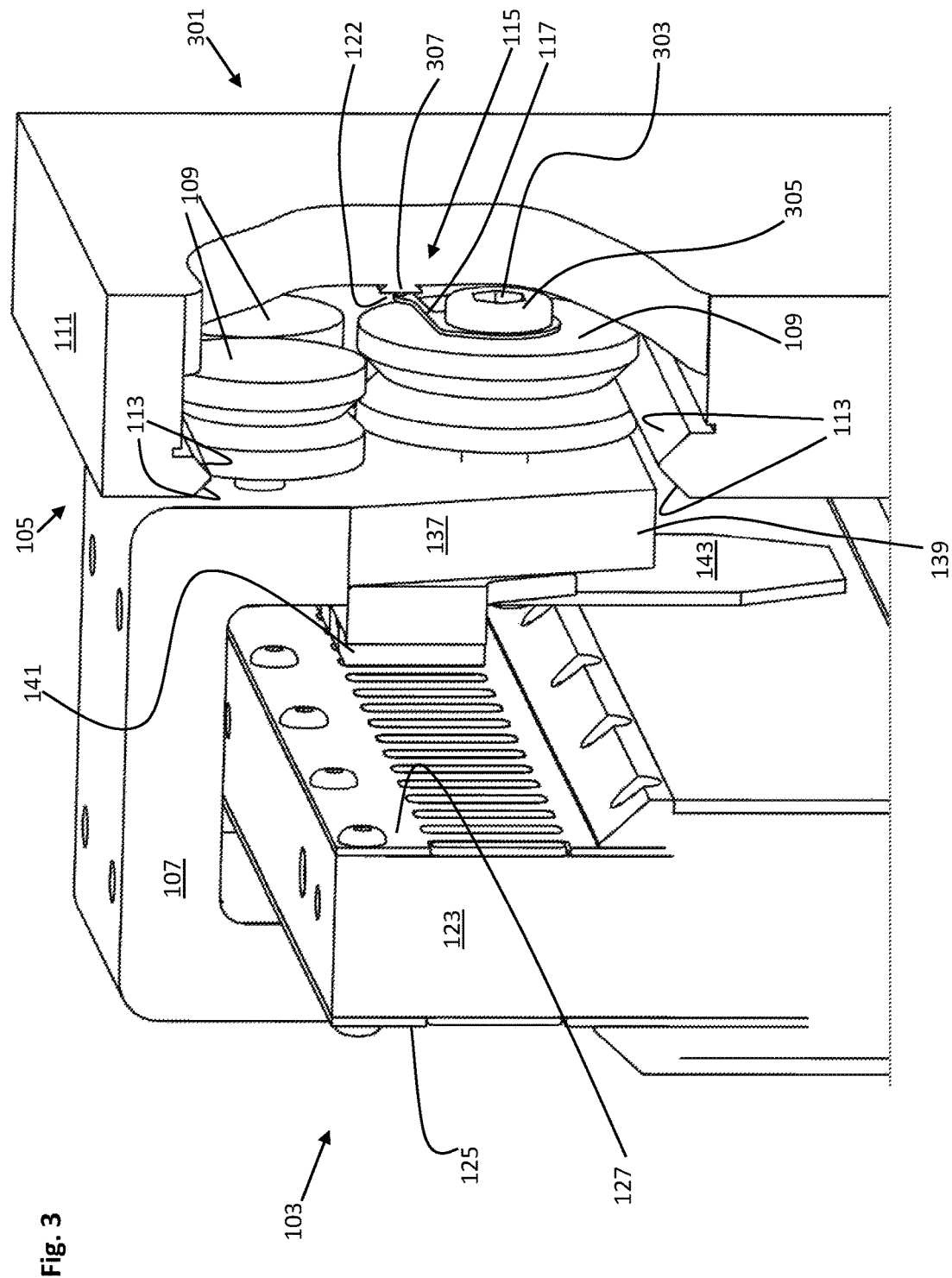
FIG. 3 shows a further transport system.

FIG. 3 shows a further transport system 301.

In the case of the transport system 301, the guide rail 111 is arranged not above the stator device 123 but laterally adjacent to the stator device 123. This thus means in particular that the guide rail 111 is arranged laterally adjacent to one of the two circuit boards 125 and 127. In the exemplary embodiment shown in FIG. 3, the guide rail 111 is provided on the right, adjacent to the circuit board 127.

In the transport system 301, the carriage 107 comprises three rollers 109 which can roll on correspondingly formed running surfaces 113 of the guide rail 111. Here, two rollers are arranged adjacent to one another and above the third roller 109. In a side view, the spindles 303 would form corners of an isosceles triangle (cf. FIG. 7).

An electrically conductive component 117 is fastened to a spindle 303 of the lower roller 109. This is realized in particular by way of a screw 305. The component 117 is in the form of a spring element (cf. FIGS. 10 and 11) and bears by way of one end against a surface of a surface projection 307 of the guide rail 111. Said surface of the surface projection 307 thus forms the contact surface 122. The surface projection 307 has a dovetail shape, wherein the contact surface 122 is that surface of the dovetail shape which is averted from the guide rail surface. Said contact surface 122 of the surface projection 307 may preferably be gold-plated and/or nickel-plated. In a further exemplary embodiment, the surface projection 307 may have flow-off bores via which a fluid, for example a lubricant, can flow off. In this way, wetting of the contact surface 122 with a fluid of said type can advantageously be prevented.

By virtue of the fact that the component 117 is in the form of a spring element, one end of the component is pressed against the contact surface 122 with a predetermined contact pressure at all times. Even if a spacing between the lower roller 109 and the guide rail 111 changes, the electrical contact between the component 117 and the contact surface 122 is advantageously maintained.

In an embodiment, provision may be made for the electrically conductive component 117 to be an antistatic brush. The antistatic brush makes contact, by way of its brush hairs and/or brush fibers, with the contact surface 122. The antistatic brush is in particular fastened to the spindle 303.

Figure 4:
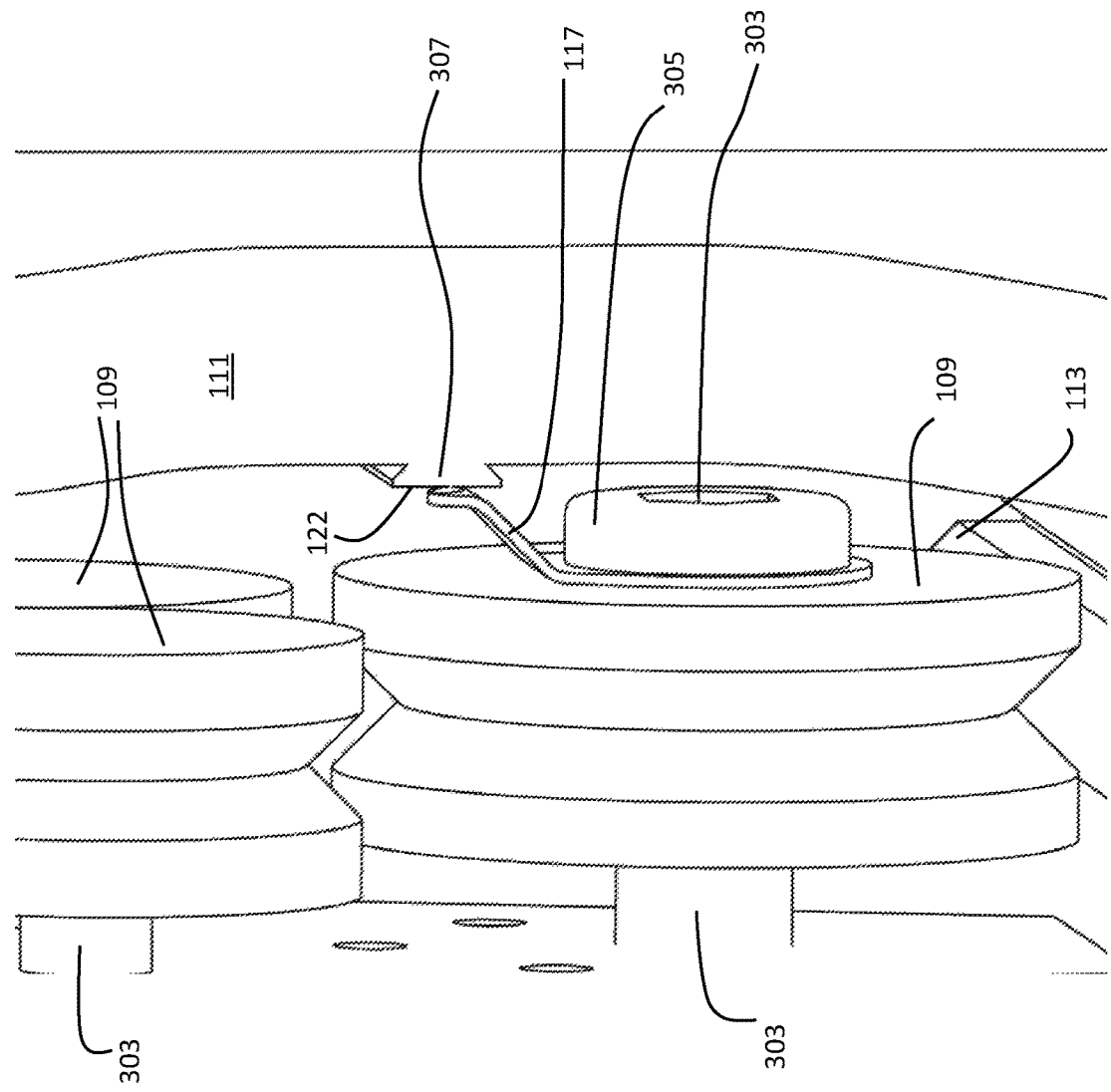
FIG. 4 shows an enlarged detail view of the transport system as per FIG. 3.

FIG. 4 shows an enlarged detail view of the lower roller 109 as per FIG. 3.

Figure 5:
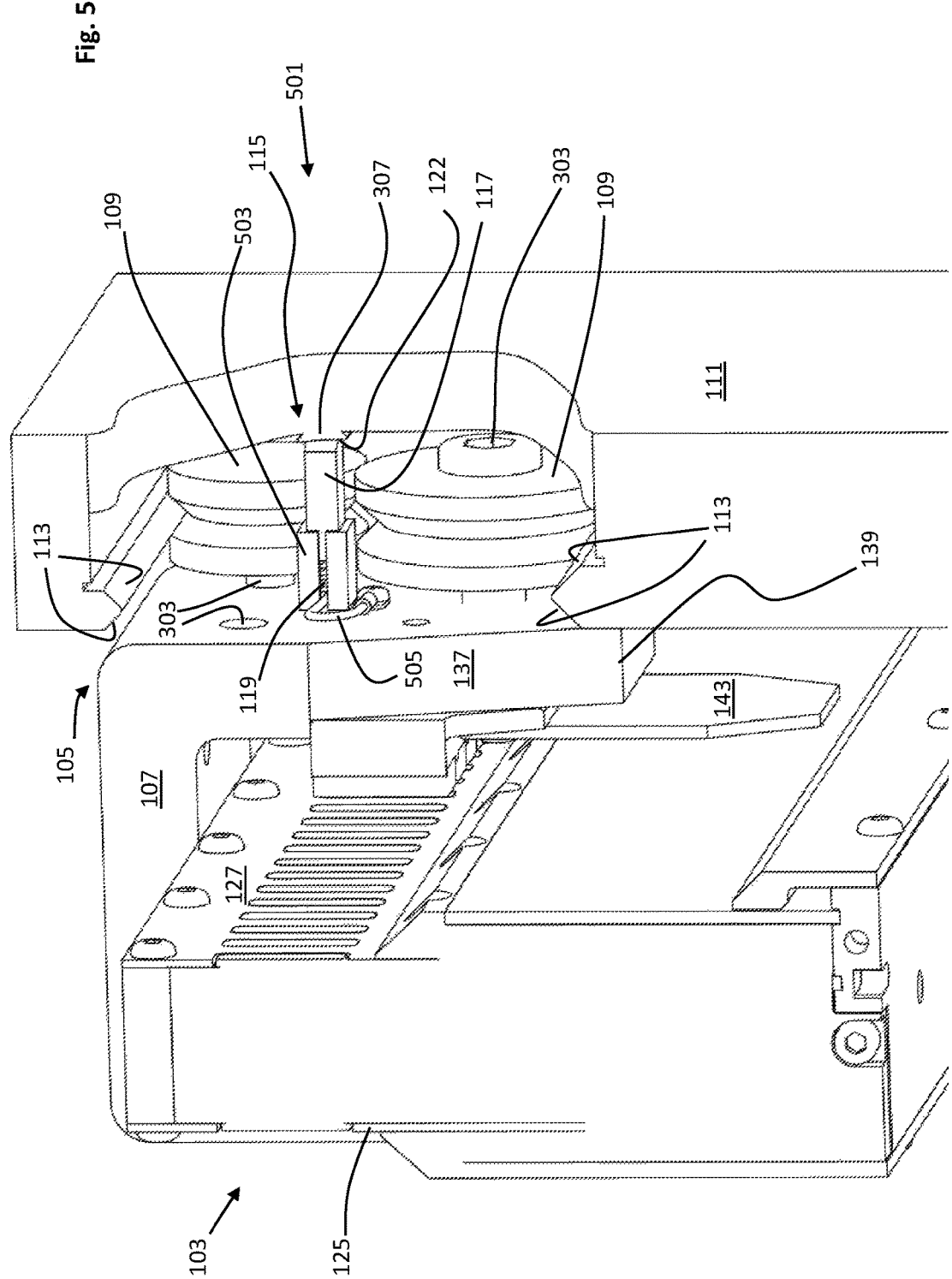
FIG. 5 shows another transport system.

FIG. 5 shows another transport system 501.

In this exemplary embodiment, analogously to the construction as per FIG. 3, the carriage 107 has three rollers 109 (cf. FIG. 7), wherein, however, for the sake of clarity, only the lower roller 109 and the rear upper roller 109 of the two upper rollers 109 are illustrated. Likewise analogously to the exemplary embodiment as per FIG. 3, the guide rail 111 is arranged on the right, adjacent to the second circuit board 127. The electrically conductive component 117 is received at least partially in a guide sleeve 503 which is arranged on the limb 137, more precisely on a surface, which faces the guide rail 111, of the limb 137. In the guide sleeve 503 there is also provided a spring 119 which is provided between the carriage 107 and the component 117. In this way, it is thus advantageously possible for the spring 119 to exert a predetermined spring force on the component 117, such that the electrically conductive component 117 is pressed against the contact surface 122 with a predetermined contact pressure. Here, analogously to the exemplary embodiment as per FIG. 3, the contact surface 122 is in the form of a surface of a surface projection 307 which has a dovetail shape.

Furthermore, an electrically conductive cable 505 is provided which is connected both to the electrically conductive component 117 and to the carriage 107. By way of this, an electrical connection between component 117 and the carriage 107 is thus advantageously realized. In this way, it is advantageously possible for a spring 119 to be used which itself is not electrically conductive or exhibits only poor electrical conductivity. If the spring 119 is itself electrically conductive, it is for example possible to dispense with the cable 505. Provision may for example be made for the cable 505 and the spring 119 to be electrically conductive, such that in this case, a particularly good electrical connection is realized between the component 117 and the carriage 107.

In an embodiment, provision may be made for the electrically conductive component 117 to be an antistatic brush. The antistatic brush makes contact, by way of its brush hairs and/or brush fibers, with the contact surface 122. The antistatic brush is in particular received in the guide sleeve, wherein the brush hairs and/or brush fibers are pressed against the contact surface 122 owing to the spring force.

Figure 6:
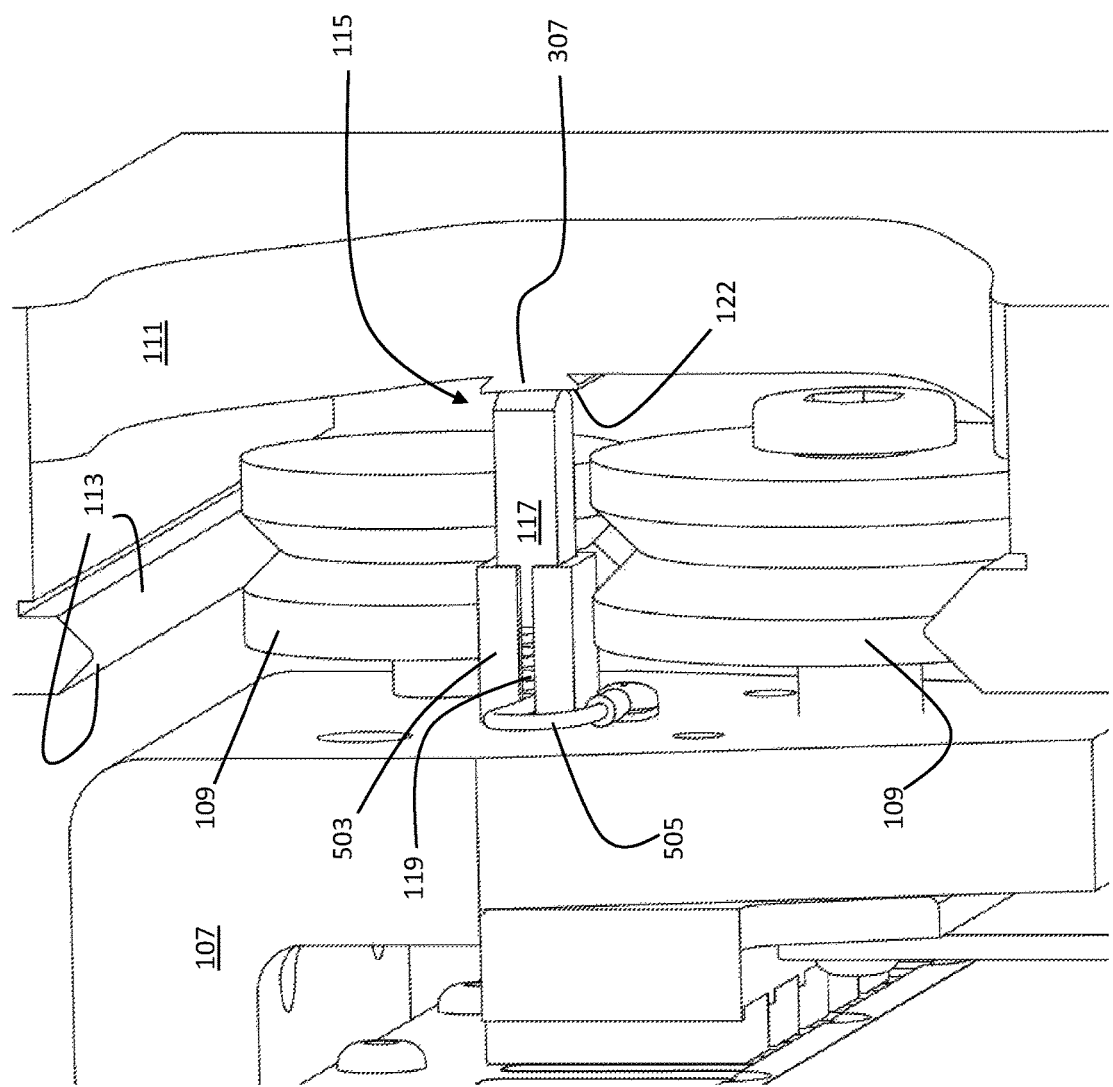
FIG. 6 shows an enlarged detail view of the transport system as per FIG. 5.

FIG. 6 shows an enlarged detail view of the lower roller 109 as per FIG. 5.

Figure 7:
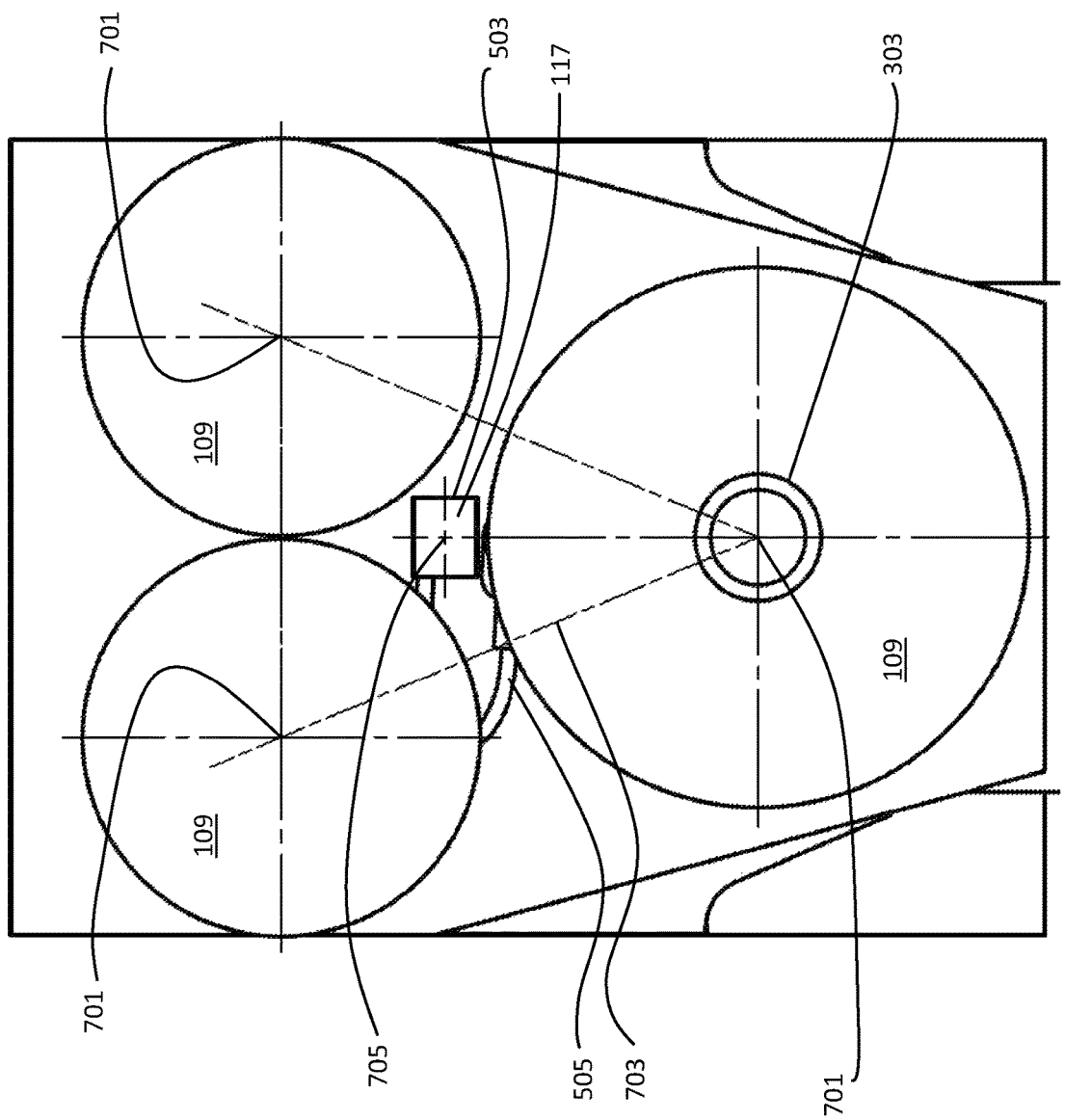
FIG. 7 shows three rollers in a side view.

FIG. 7 shows the three rollers 109 as per the exemplary embodiment shown in FIG. 5 in a side view. Even though the transport system 501 as per FIG. 5 differs from the transport system 301 as per FIG. 3 by the type of component 117, the arrangement of the three rollers 109 is the same in both embodiments.

A respective central point of the rollers 109 (and thus of the corresponding spindles) is denoted by the reference designation 701. The three central points 701 thus form a triangle 703, wherein the three rollers 109 are arranged such that the three central points 701 form an isosceles triangle. The geometric center of the isosceles triangle 703 is denoted by the reference designation 705. The component 117 is arranged in alignment with the geometric center 705. A contact point of the component 117 with the contact surface 122 is, owing to said aligned arrangement, arranged opposite the geometric center 705.

The principle whereby the contact point of the component 117 with the contact surface 122 is situated opposite the geometric center of the polygonal region formed by way of the central points of the rollers or spindles can be transferred to any desired number of rollers. The number may for example be 2, 3, 4, 5, 6, 7 or 8.

FIG. 8 shows a transport system 801 which is for example of analogous design to the transport system 101 from FIG. 1 or which comprises multiple such transport systems 101. Here, the corresponding individual constituent parts are then elongated or connected to transport systems of correspondingly identical form, such that the guide path 803 shown in FIG. 8 can be constructed.

The upper left drawing in FIG. 8 shows a side view of the transport system 801. The lower drawing in FIG. 8 shows a plan view of the transport system 801. The upper right drawing in FIG. 8 shows a sectional view from a side elevation.

The transport system 801 comprises multiple linear motors 805 and 807, which are shaped correspondingly to the guide path 803. Thus, two arcuate linear motors 805 are provided which are arranged opposite one another. To connect the two arcuate linear motors 805 such that the guide path 803 can be formed, multiple straight linear motors 807 are provided. The linear motors 805 are, in terms of construction, of analogous form to the linear motor 103, with merely the shapes and dimensions of the individual constituent parts of the linear motors 805 being adapted to the arcuate shape. The linear motors 807 are formed analogously to the linear motor 103. The respective guide rails thus form the guide path 803 for the carriage 107.

The individual linear motors 805 and 807 can be operated independently of one another. This thus means in particular that each of the linear motors 805 and 807 can be actuated independently of the other linear motors, such that each linear motor can exert a driving force or braking force on one or more carriages 107. Each linear motor can thus accelerate or brake one or more carriages 107 at different speeds, specifically independently of the other carriages 107.

By way of the position detection element 143, each carriage 107 can be assigned an absolute and/or relative position on the guide path 803.

The concept here is thus in particular that of providing multiple linear motors which are formed separately from one another and which are formed correspondingly to the linear motors described in the context of this description (including the reference to the German patent applications DE 10 2012 204 916.9 and DE 10 2012 204 919.3 cited in the description). Said linear motors are connected to one another such that, for example, a closed or open guide path is formed. Here, the linear motors are formed correspondingly to the desired shape of the guide path. The individual guide rails of the linear motors form the guide path on which the carriages travel by way of their rollers.

The guide path is thus constructed in modular fashion from the multiple linear motors, which can be operated and actuated independently of one another. For example, if it is necessary for one linear motor to be exchanged, this can be performed quickly and easily without great outlay.

Provision may preferably be made for multiple linear motors to share or have a common guide rail. Thus, one continuous running surface for the rollers is formed across multiple linear motors. It is thus advantageously possible for jolts in the movement of the carriages 107 to be avoided, such as could arise in the event of the carriages 107 travelling from a guide rail of one linear motor to a further guide rail of a further linear motor. This is because gaps can commonly form between the individual guide rails, for example owing to temperature differences. This risk does not exist in the case of one continuous guide rail.

Figure 9:
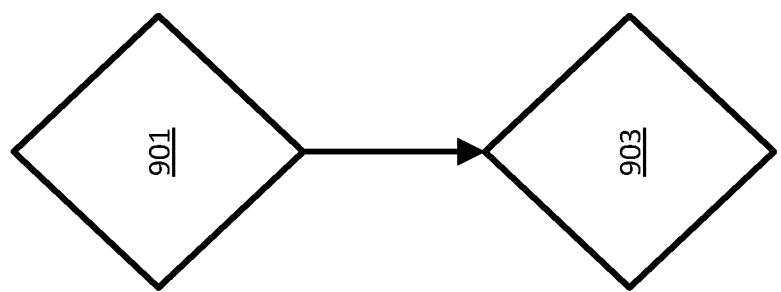
FIG. 9 shows a flow diagram of a method for the operation of a transport device.

FIG. 9 shows a flow diagram of a method for the operation of a transport device. The transport device may for example be one of the transport devices described in more detail above.

In a step 901, the carriage is displaced and, in the process, is guided by way of the guide rail. In a step 903, during the displacement, an electrical connection is formed between the carriage and the guide rail by way of the electrical contacting device.

Figure 10:
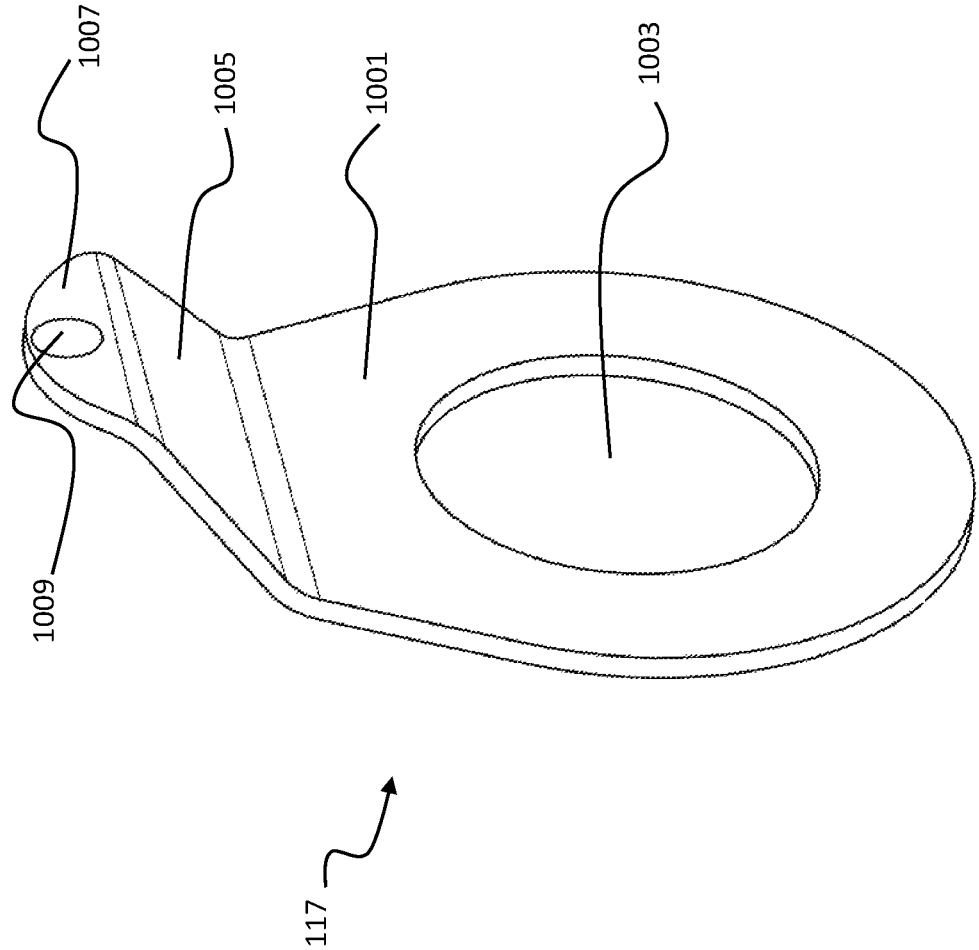
FIG. 10 shows a component.

FIG. 10 shows the component 117 from the linear transport system 301 as per FIG. 3.

The component 117 comprises a ring-shaped section 1001 with a cutout 1003. The cutout 1003 is dimensioned in terms of diameter such that the screw 305 can be passed through the cutout 1003 for the purposes of screwing the ring-shaped section 1001 to the spindle 303.

The ring-shaped section 1001 is adjoined by a spring limb 1005 which protrudes at a predetermined angle from the ring-shaped section 1001. The spring limb 1005 adjoins a contact section 1007 which forms an angle with the spring limb 1005 such that the contact section 1007 runs parallel to the ring-shaped section 1001. The spring limb 1005 and the contact section 1007 form a contact arm for the contacting of the component 117 with the contact surface 122. The contact section 1007 has an elevation or a projection 1009 which may be of lens-shaped form. The elevation 1009 makes contact with the contact surface 122, that is to say bears against the contact surface 122. In an embodiment, provision may be made for the contact section 1007 to have no such elevation, that is to say to be planar.

The material and the dimensions of the component 117 are selected such that the spring limb 1005 acts as an elastic element between the contact section 1007 and the ring-shaped section 1001. In this way, a spring force can be generated which presses the elevation 1009 of the contact section 1007 against the contact surface 122 during the guidance.

In an embodiment, in particular if no elevation 1009 is provided, provision may be made for multiple electrically conductive brush hairs and/or multiple electrically conductive brush fibers to be arranged on the contact section 1007. In such an embodiment, the component 117 is in the form of an antistatic brush.

Figure 11:
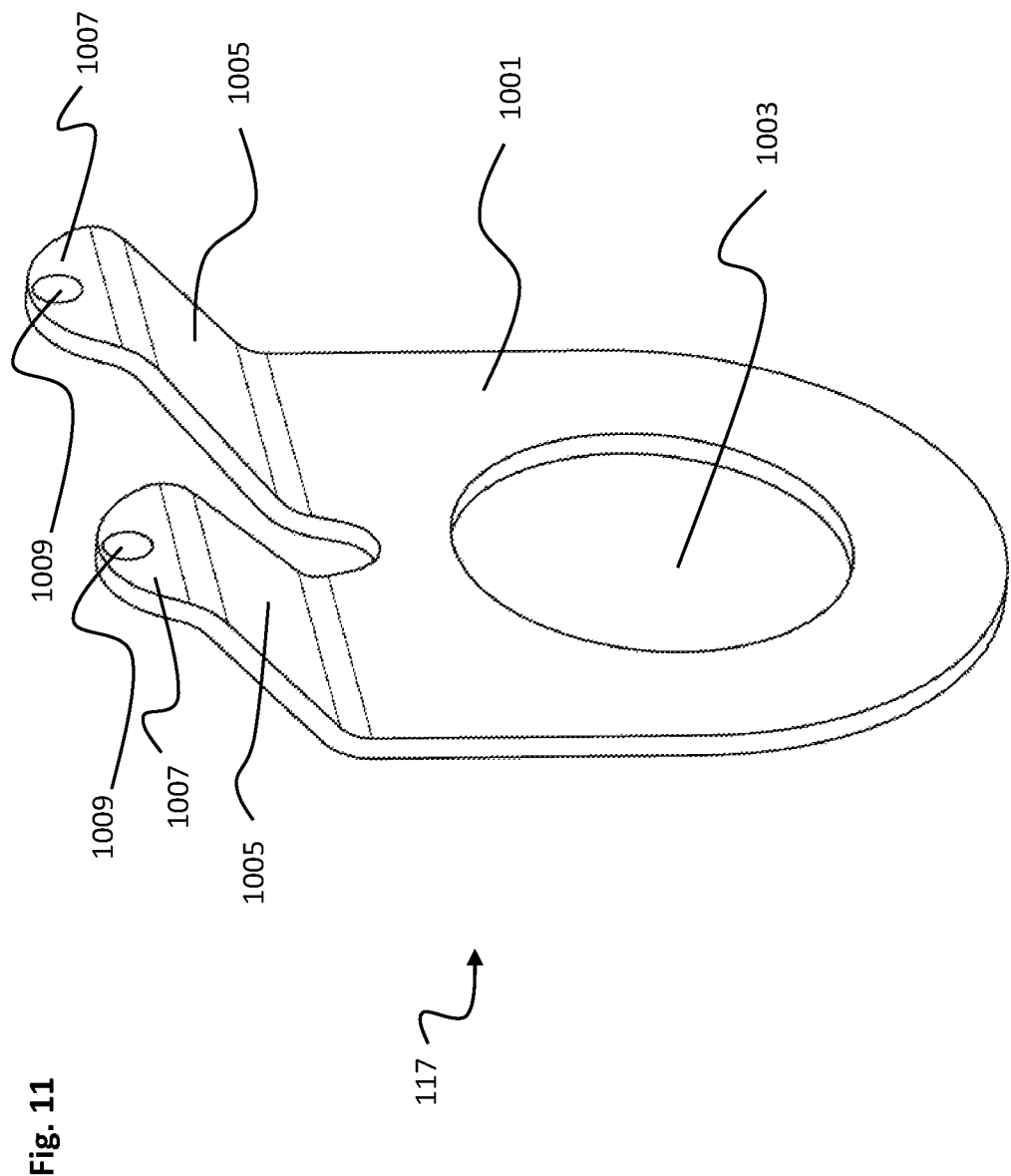
FIG. 11 shows a further component.
Figure 12:
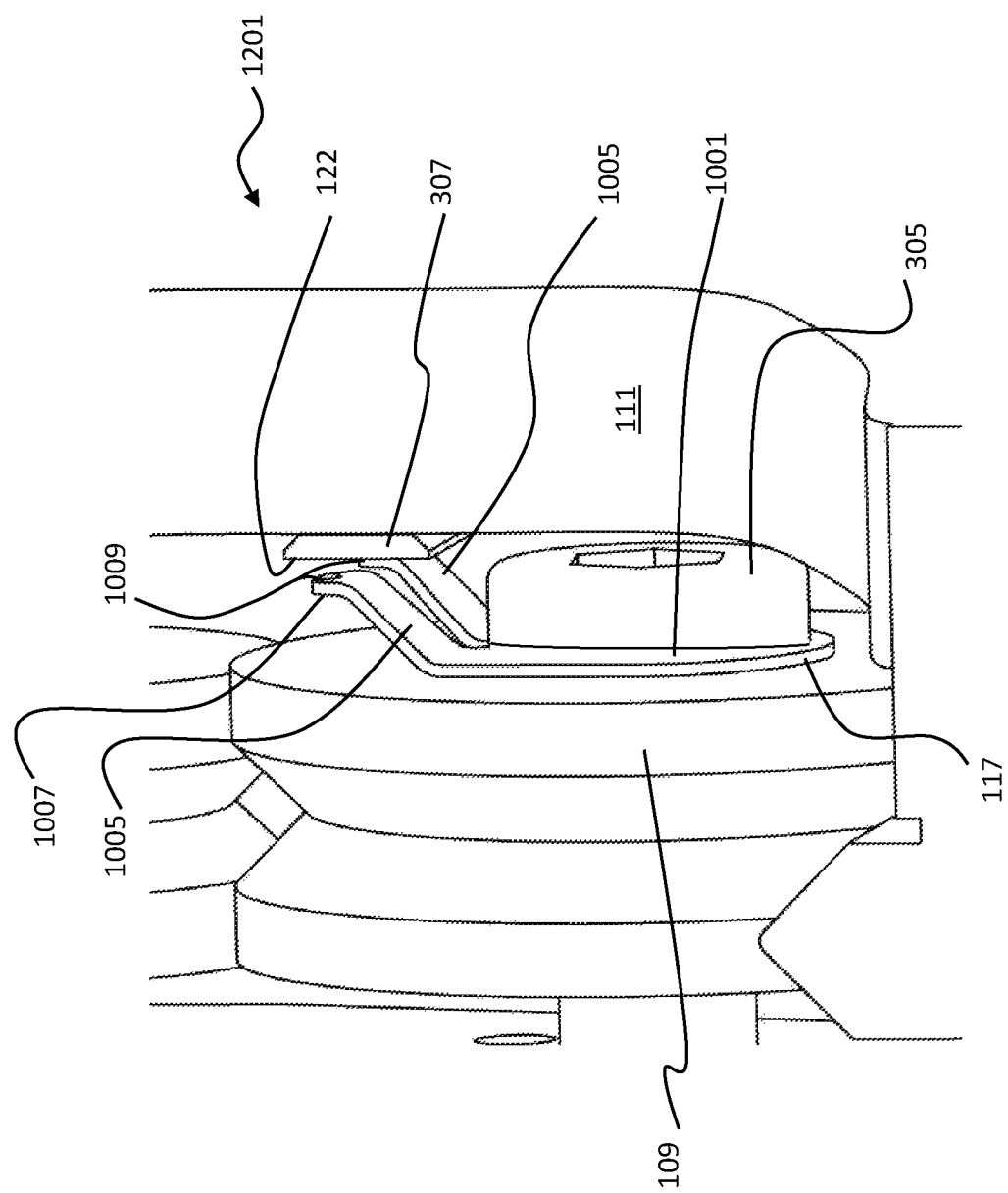
FIG. 12 shows a linear transport system.

FIG. 11 shows a further component 117, such as may be used for example in the linear transport system 301 as per FIG. 3 (cf. FIG. 12).

The further component 117 is of substantially analogous form to the component 117 shown in FIG. 10. As a difference, that further component 117 has two spring limbs 1005 which, analogously to FIG. 10, each have a contact section 1007 comprising an elevation or a projection 1009. The corresponding statements apply analogously here. In this way, dual contacting is thus realized. It is thus possible, for example, for one of the two contact sections 1007 to lose contact with the contact surface 122 without the electrical connection between the carriage 107 and the guide rail 111 being interrupted entirely.

In the embodiment as per FIG. 11, too, component 117 may be in the form of an antistatic brush. The component 117 may thus preferably have, on its contact sections 1007, in each case multiple electrically conductive brush hairs and/or multiple electrically conductive brush fibers.

In further exemplary embodiments, provision may be made of more than two spring limbs with corresponding contact sections comprising an elevation or a projection. For example, three spring limbs may be provided. Multiple contacting is thus advantageously realized, which yields redundancy with regard to the electrical connection. For example, in each case multiple electrically conductive brush hairs and/or multiple electrically conductive brush fibers are arranged on the contact sections. In this embodiment, the component is thus an antistatic brush. It is preferable, in the case of multiple contact sections 1007, for only some of the contact sections 1007 to have multiple electrically conductive brush hairs and/or multiple electrically conductive brush fibers. Such embodiments are also antistatic brushes.

The components 117 that have been described in more detail in conjunction with FIGS. 11 and 12 are themselves also disclosed individually, that is to say in particular independently and separately from the further specific features of the exemplary embodiments shown in the further figures.

FIG. 12 shows a linear transport system 1201 which is of substantially analogous construction to the linear transport system 301 as per FIG. 3.

In the linear transport system 1201, the component 117 as per FIG. 11 is used. Furthermore, as a further difference, the surface projection 307 is in the form of a component formed separately from the guide rail 111, for example in the form of a separate strip. The strip may preferably be screwed to the guide rail 111. In particular, spacers may be provided between the guide rail 111 and the strip, such that the strip is arranged spaced apart from the guide rail 111. The shape and/or the material of the separately formed surface projection may for example be analogous to those of the integrally formed surface projection.

Figure 13:
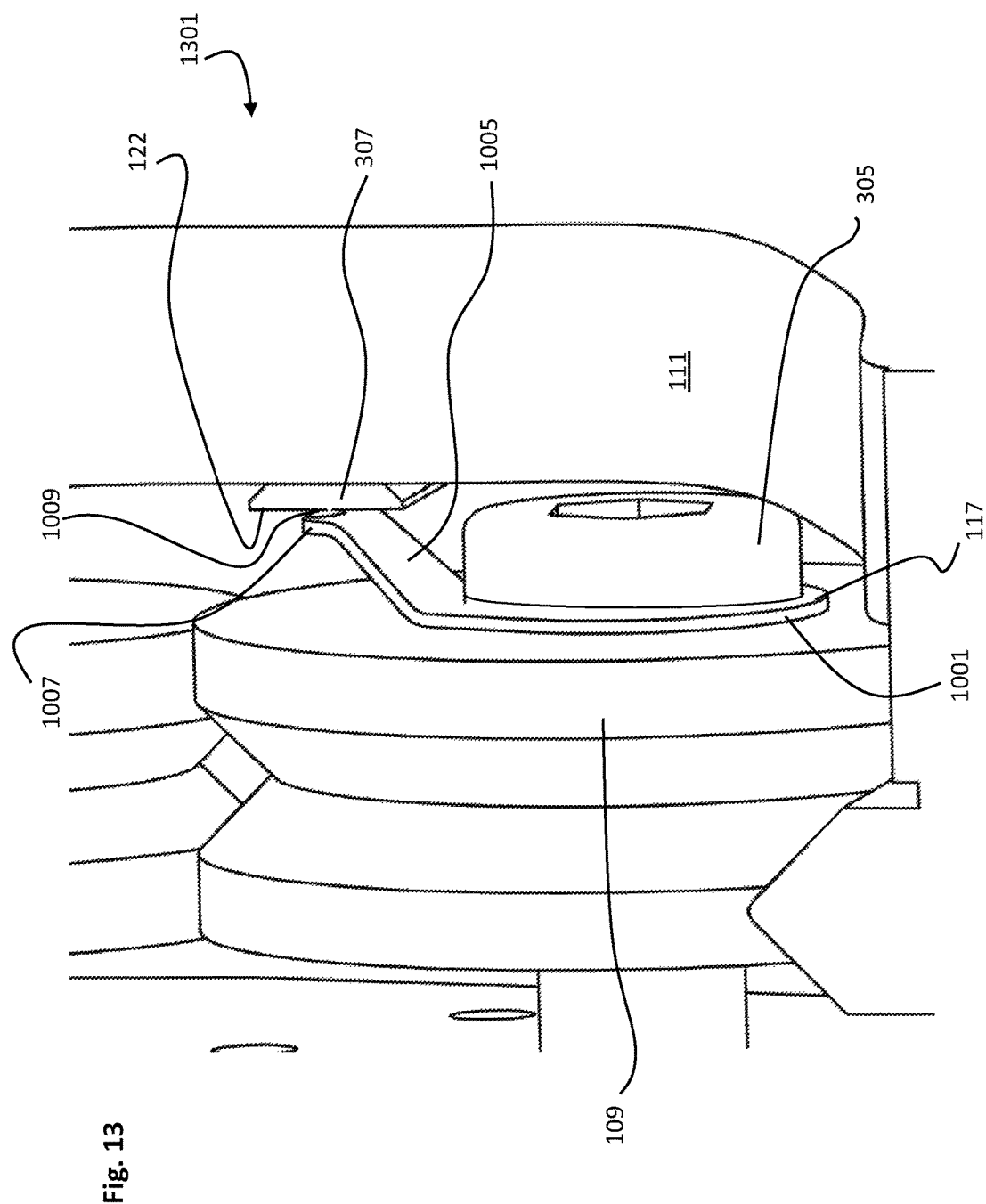
FIG. 13 shows yet another linear transport system.

FIG. 13 shows yet another linear transport system 1301, which is of substantially analogous construction to the linear transport system 301 as per FIG. 3.

In the linear transport system 1301, the component 117 as per FIG. 10 is used, as has already been shown in FIG. 3. As a difference in relation to the linear transport system 301, it is the case in the linear transport system 1301 that the surface projection 307 is in the form of a component formed separately from the guide rail 111, analogously to the linear transport system 1201 as per FIG. 12. Reference is made to the corresponding embodiments.

In summary, this improvement encompasses the concept whereby, during the displacement of a carriage by way of a linear motor, an electrical connection is formed between the carriage and the guide rail. Said electrical connection is realized in particular by way of an electrically conductive component which is formed separately from the roller of the carriage.

According to one aspect, a transport device is provided, comprising:
at least one carriage which has at least one roller,
a guide rail for guiding the carriage,
wherein the guide rail comprises a running surface for the rolling of the roller, such that the roller can roll on the running surface during a displacement, guided by way of the guide rail, of the carriage,
wherein at least one electrical contacting device is provided which is formed separately from the roller and which is designed to form an electrical connection between the carriage and the guide rail during the displacement, guided by way of the guide rail, of the carriage.

According to a further aspect, a method for operating the transport device is provided, wherein, during the displacement, guided by way of the guide rail, of the carriage, the electrical contacting device forms an electrical connection between the carriage and the guide rail.

According to a yet further aspect, a transport system is provided which comprises the transport device and a drive device for driving the carriage.

This improvement thus encompasses the concept whereby, during the displacement of the carriage, an electrical connection is formed between the carriage and the guide rail. This is provided in particular by way of an electrical contacting device which is formed separately from the roller. This thus means in particular that the electrical contacting device comprises an element or multiple elements which is or are formed or produced separately from the roller. Thus, in particular, an electrical connection between the carriage and the guide rail is formed by way of the electrical contacting device. This is the case in particular after the carriage has been placed by way of its roller into the guide rail.

In this way, it is thus advantageously possible for an electrical charge which forms on a surface of the carriage during the displacement to flow off to the guide rail via the electrical contacting device. An electrostatic charge of the carriage can thus advantageously be reduced or even prevented. This can thus advantageously prevent a sparkover, that is to say a spark discharge, between the carriage and the guide rail. In this way, damage to electrical components can be advantageously prevented. Likewise, a risk of electric shock to a user can be eliminated. A risk of fire and/or an electrical malfunction of electrical components can likewise advantageously be reduced or even prevented. The electrical contacting device thus advantageously acts analogously to a lightning conductor or to a ground connection. In this respect, the electrical contacting device may also be referred to as a grounding device or as a discharging device.

In one embodiment, provision may be made for the electrical contacting device to comprise an electrically conductive fluid, which is applied to a rolling surface, which can run on the running surface, of the roller and/or to the running surface.

In this way it is advantageously made possible for an electrical connection between the roller and the guide rail to be formed in a simple manner in an existing transport device. More comprehensive conversion measures in an existing transport device are thus advantageously no longer necessary. The fluid may preferably be a lubricant. A lubricant may for example be an oil. The lubricant, in particular the oil, may for example comprise an electrically conductive additive or electrically conductive additives. An electrically conductive additive of said type may for example be graphite. It is thus advantageously possible for a dual function to be realized: lubrication by way of the lubricant, and an electrical connection owing to the electrically conductive additives (this should also be read as encompassing the singular). This is advantageous in particular in the case of rollers composed of metal. This is because, here, a lubricant must generally be used. Since it is however normally the case that, above a minimum speed, the rollers composed of metal will slide on the lubricant, there is in this case no longer a direct connection between the roller and the running surface; the lubricant is arranged in between. An electrical connection is however nevertheless realized in this case owing to the electrically conductive additives or the electrically conductive additive.

In another embodiment, multiple carriages may be provided. The carriages may in particular be of identical or preferably different form.

In a further embodiment, provision may be made for the carriage to have multiple rollers. The rollers may in particular be of identical or preferably different form.

In a further embodiment, multiple electrical contacting devices may be provided. The electrical contacting devices may for example be of identical or preferably different form.

In another embodiment, there may be provided an electrically conductive contact surface which is electrically connected to the guide rail, wherein the electrical contacting device comprises at least one electrically conductive component which is arranged on the carriage and which is electrically connected to the carriage and which is designed to make electrical contact with the contact surface during the guided displacement. This thus means in particular that the component forms an electrical connection between the carriage and the guide rail.

A flow-off of charge carriers via the component to the guide rail is thus advantageously made possible, analogously to a lightning conductor or to a ground connection. In this embodiment, it is in particular advantageously possible to dispense with a fluid, in particular a lubricant. This is because, here, the charge carriers are conducted away in particular via the component. This is particularly advantageous in the food industry and/or in medical or pharmaceutical technology. Here, it is generally the case that fluids are undesirable or not permitted owing to a possibility of contamination. However, if the specific application permits the use of fluids, it is possible, in addition to the component, for an electrically conductive fluid, in particular as described above, to be provided. Then, a particularly reliable electrical connection is advantageously realized: a dual connection. This is particularly efficient and particularly effective. Thus, redundancy is realized with regard to the electrical connection between carriage and guide rail.

In one embodiment, between the component and the carriage, there may be provided a spring for exerting a spring force on the component, such that the component is pressed against the contact surface by way of the spring force during the guidance.

The component is thus advantageously pressed against the contact surface with a defined contact pressure. Even if a spacing between the contact surface and the component changes as a result of a shock or a vibration, said change in spacing will be compensated by the spring. Thus, a particularly reliable electrical connection is advantageously realized.

In a further embodiment, provision may be made for the carriage to comprise a recess in which the spring is received. In this way, particularly secure retention or arrangement of the spring is thus advantageously realized.

In yet another embodiment, provision may be made for the component to be fastened to a spindle of the roller. In this way, a particularly efficient arrangement of the component on the carriage can be realized, because no separate fastening region has to be provided on the carriage for the component. Furthermore, a spacing between a spindle of the roller and the guide rail is smaller in relation to other regions of the carriage, such that here, the component can be designed to be correspondingly smaller. In this way, it is thus advantageously possible for material to be saved.

In yet another embodiment, provision may be made for the carriage to have multiple rollers, and for the guide rail to comprise corresponding running surfaces, wherein a contact point of the component with the contact surface during the guided displacement is situated opposite a polygonal region whose corners are formed in each case by a central point of the respective spindles of the rollers. In the case of three rollers, a triangle, in particular an isosceles triangle, is thus formed as a polygonal region.

This exemplary arrangement has the advantageous effect that, during a displacement of the carriage along the guide rail, the contact point moves along a defined path. In particular, when travelling around corners, acceleration forces on the component are reduced. Furthermore, unevennesses of the running surface or fouling no longer leads to considerable deflection of the component. Lever effects on the component during the displacement are reduced.

The contact point is preferably arranged opposite the geometric center of the polygonal region. In the case of this specific arrangement, no lever acts on the component. In particular, no additional acceleration forces act on the component when travelling around corners. Furthermore, unevennesses of the running surface and fouling no longer lead to unduly great deflections of the component. In particular, the contact point no longer projects into the running surface when travelling around corners. An arrangement of the contact point so as to be situated opposite the geometric center of the polygonal region leads in particular to a path on the guide rail, which, even when the carriage is travelling around corners, is always situated with a constant spacing to the raceways and running surfaces of the rollers.

In another embodiment, a fluid flow-off device may be provided, via which a fluid flowing on a guide rail surface can flow off before it flows onto the contact surface.

It is advantageously possible for a fluid, in particular a lubricant, for example an oil, to flow off via the fluid flow-off device. In this way, it is advantageously possible for the contact surface to be protected against being fouled with the fluid. This could otherwise lead to worsened electrical conductivity. It is thus advantageously possible in particular for a lubricant, in particular an oil, to be used for the lubrication between rollers and guide rail, without an electrical connection being impaired as a result. This is because the lubricant advantageously flows off via the fluid flow-off device. For example, the fluid flow-off device may comprise one or more holes or outflow bores. These are provided or arranged for example on the guide rail, for example in an immediate vicinity of the contact surface.

In a further embodiment, a fluid barrier device may be provided for protecting the contact surface against a fluid flowing on a guide rail surface.

It is thus advantageously possible for wetting of the contact surface with fluid to be reduced or prevented. An electrical connection is thus advantageously not influenced or, at most, only minimally influenced. Charge carriers can thus advantageously continue to flow off despite the use of a fluid, for example for lubrication purposes. The fluid barrier device thus advantageously acts as a fluid barrier similarly to a levee.

In a further embodiment, provision may be made for the fluid barrier device to comprise a surface projection of the guide rail surface.

The surface projection is preferably formed integrally with the guide rail. The guide rail and the surface projection thus preferably form a common component. The surface projection can thus be formed directly during the production of the guide rail. A surface projection is a particularly simple possibility for a fluid barrier.

In another embodiment, the surface projection is formed as a component which is separate from the guide rail. In this embodiment, the separate component is arranged on or fastened to the guide rail. This is realized in particular such that the component is in direct contact with the guide rail surface. The advantage of a separate component lies in particular in the fact that an existing transport device can also be retrofitted with a fluid barrier device.

In a further embodiment, multiple surface projections may be formed. In particular, said surface projections may be of identical or preferably different form. In particular, at least one of the multiple surface projections may be formed as a component which is integral with the guide rail, wherein at least one other of the multiple surface projections is in the form of a component which is separate from the guide rail.

In a further embodiment, flow-off bores or holes of a fluid flow-off device may be formed on the surface projection.

In a further embodiment, provision may be made for the surface projection to have a dovetail shape, and for the contact surface to be a surface, which is averted from the guide rail surface, of the dovetail shape.

A dovetail shape, owing to its specific shape, is particularly suitable as a fluid barrier. This is because the fluid is in particular advantageously received in the connecting region between dovetail and guide rail surface. The fluid is thus received in particular in the angle formed between that side of the dovetail which makes direct contact with or directly adjoins the surface and the surface, wherein said angle is generally an acute angle. The fluid will generally not be able to flow towards said acute angle to the contact surface. Here, gravitational force counteracts the flow of the fluid. This is dependent in particular on the specific spatial arrangement of the transport device.

In a further embodiment, provision may be made for the fluid barrier device to comprise a strip which is formed separately from the guide rail and which is arranged on the guide rail so as to be spaced apart from the guide rail surface and which is electrically connected to the guide rail, wherein the contact surface is a surface of the strip.

Owing to the spacing between the strip and the guide rail surface, it is advantageously possible for a fluid to flow, unhindered, over the entire guide rail surface, but without wetting the contact surface. It is thus possible for a fluid to be used for lubrication purposes. An electrical connection between carriage and guide rail is nevertheless realized. For example, the strip may be screwed to the guide rail by way of screws. It is for example possible for a spacer, for example a sleeve, to be provided between the strip and the guide rail surface. In particular, it is possible for multiple spacers to be provided. The electrical connection may be realized in particular by way of the screw or by way of the screws.

In a further embodiment, multiple electrically conductive components may be provided, which are each arranged on the carriage. The components may for example be of identical or preferably different form.

In this way, redundancy is advantageously realized with regard to the electrical contacting. Even if one of the components temporarily loses contact with the contact surface, the other components will generally remain in contact. An overall resistance of the electrical connection formed by the multiple components is advantageously lower than in the case of a single component. It is thus advantageously possible to realize improved electrical conductivity. This advantageously yields an improved dissipation of the electrical charge carriers formed on the surface of the carriage.

In yet another embodiment, provision may be made for the component to have a contact arm, in particular multiple contact arms, for the electrical contacting. This thus means in particular that the electrical connection between the carriage and the guide rail is realized or formed by way of the contact arm or by way of the contact arms.

In the case of multiple contact arms, it is possible, without great disadvantage, for one of the contact arms to lose contact, for example owing to vibrations, without the component as a whole losing electrical contact. This is because the electrical contact can be maintained via the further contact arms. Thus, redundancy with regard to the electrical contacting is advantageously realized. The contact arms may for example be in the form of spring elements.

In a further embodiment, provision may be made for the component to be in the form of a spring element.

The corresponding advantages of this embodiment are analogous to those of the embodiment with the spring. Here, the contact pressure is imparted by way of the component itself. Thus, a separate spring is advantageously no longer needed. Material can thus be saved.

In another embodiment, provision may be made for the contact surface to be coated with an electrically conductive layer.

Through the provision of the layer, it is possible, depending on the material or material composition of the layer, to realize improved electrical conductivity. The layer can thus advantageously act as a protective layer, and can in particular be referred to as such. For example, the protective layer may be a corrosion-preventing layer, that is to say may have corrosion-preventing characteristics, that is to say in particular may comprise corrosion-preventing materials. As material for the layer, it is possible, for example, for gold and/or nickel to be provided. This thus means in particular that the contact surface may be gold-plated and/or nickel-plated. The layer may in particular comprise gold and/or nickel. Thus, the transport device can advantageously also be used in environments with aggressive and surface-damaging ambient conditions, for example in an acidic ambient atmosphere.

In a further embodiment, provision may be made for the component to be an antistatic brush. An antistatic brush has, in particular, multiple brush hairs and/or brush fibers which are electrically conductive. The brush hairs and/or the brush fibers make contact with the contact surface during the guidance. Multiple contacting is thus advantageously realized by way of the multiple brush hairs and/or brush fibers. In this way, redundancy with regard to electrical contacting is thus advantageously realized. The brush hairs and/or the brush fibers may for example be formed from carbon or comprise carbon. The expression "bristles" can preferably be used as an all-encompassing term for the brush hairs and/or the brush fibers.

In another embodiment, provision may be made for the drive device to comprise a linear motor.

In this context, a linear motor corresponds in particular to a linear embodiment of a rotary machine, having an energizable primary part, which is comparable to a stator of a rotary motor, and a secondary part, which corresponds to a rotor of the rotary motor. In the case of linear motors, it is possible in particular to make a distinction between asynchronous and synchronous motors, wherein, in the case of the asynchronous design, the secondary part is equipped with short-circuit bars, whereas, in the case of the synchronous motor, the secondary part is composed of permanent magnets. Synchronous motors have the advantage in particular that they exhibit high efficiency and high continuous thrust forces. In this context, linear motors may be used in particular for generating translatory thrust movements or displacements. In the light of the statements made above, a linear motor may comprise in particular a stator device (the energizable primary part) and a reaction part (the secondary part). The reaction part or the secondary part may in particular be arranged on the carriage.

There is thus advantageously an interaction between the secondary part or reaction part on the carriage and the primary part, that is to say the stator device. Said interaction leads to a displacement of the carriage. Here, the carriage is guided by way of the guide rail, wherein the rollers can roll on the running surface of the guide rail during the displacement.

In one embodiment, the transport system may be designed analogously to the transport systems described in the German patent applications DE 10 2012 204 916.9 and DE 10 2012 204 919.3. The content of disclosure of said two patent applications is incorporated in its entirety here. In said documents, the transport systems are referred to as linear transport systems, because they comprise a linear motor. In the context of this application, the carriage corresponds to the vehicle in the two German patent applications cited above. A transport system comprising a linear motor may in particular be referred to generally as a linear transport system.

In one embodiment, the linear motor comprises a stator device. The stator device comprises, for example, a first circuit board and a second circuit board, which are arranged parallel to and opposite one another. The two circuit boards have, for example, multiple cutouts. Here, it is preferably the case that a respective cutout of the first circuit board is formed opposite a respective cutout of the second circuit board. This thus means in particular that the cutouts of the two circuit boards are in each case arranged opposite one another.

It is preferable for multiple coils to be arranged between the two circuit boards of the stator device. The coils are for example each wound around a stator tooth which is preferably fitted into two opposite cutouts of the two circuit boards. Electrical contacting of the coils is realized for example by way of at least one of the two circuit boards, in particular by way of both circuit boards. This thus means in particular that the coils are for example electrically contacted with the two circuit boards (or with only one circuit board).

Below the cutouts, that is to say below the coils, there is preferably provided a profile element which runs, for example, parallel to the guide rail. For example, screws are provided by way of which the two circuit boards are fastened or screwed both to the guide rail and to the profile element. For this purpose, the two circuit boards preferably have corresponding holes.

Both the guide rail and the profile element thus advantageously support the two circuit boards and advantageously effect mechanical stabilization of the stator device.

Below the profile element, there is formed, for example, a carrier profile element, with the profile element preferably being arranged on or fastened to said carrier profile element. This thus means in particular that the carrier profile element bears the stator device. In one embodiment, provision may be made for the profile element and the carrier profile element to be formed as a common profile element.

In one embodiment, provision may be made for the guide rail to be arranged above the stator device.

In one embodiment, provision may be made for the guide rail to be arranged laterally adjacent to the stator device. This thus means in particular that the guide rail is arranged laterally adjacent to one of the two circuit boards.

In another embodiment, provision may be made for the electrically conductive component to be at least partially received in a guide sleeve which is arranged on the carriage. The guide sleeve may for example be arranged on a limb of the carriage. This is the case in particular if the carriage has a U shape or C shape. The guide sleeve may preferably be arranged on a surface, which faces the guide rail, of the limb. This is the case in particular if the guide rail is arranged laterally adjacent to the stator device. In the guide sleeve there may be provided, for example, a spring which is provided between the carriage and the component.

In a further embodiment, an electrically conductive cable may be provided which is connected both to the electrically conductive component and to the carriage. An electrical connection between component and carriage is thus advantageously realized in this way. It is thus advantageously possible for a spring to be used for realizing a contact pressure of the component against the contact surface, which spring itself is not electrically conductive or exhibits only poor electrical conductivity. If the spring itself is electrically conductive, it is for example possible to dispense with the cable. Provision may for example be made for the cable and the spring to be electrically conductive, such that in this case a particularly good electrical connection between the component and the carriage is realized.

What is claimed is:
1. A linear transport system, comprising:
at least one carriage which has at least one permanent magnet and at least one roller,
an energizable stator device which has multiple coils, and
a guide rail which is arranged on the stator device and which serves for guiding the carriage,
wherein the guide rail comprises a running surface for the rolling of the roller of the carriage, such that the roller can roll on the running surface during a displacement, guided by way of the guide rail, of the carriage, wherein at least one electrical contacting device is provided which is formed separately from the roller and which is designed to form an electrical connection between the carriage and the guide rail during the displacement, guided by way of the guide rail, of the carriage,
wherein an electrically conductive contact surface is provided which is electrically connected to the guide rail, wherein the electrical contacting device comprises at least one electrically conductive component which is arranged on the carriage and which is electrically connected to the carriage and which is designed to make electrical contact with the contact surface during the guided displacement, and
wherein, between the component and the carriage, there is provided a spring for exerting a spring force on the component, such that the component is pressed against the contact surface by way of the spring force during the guidance.

2. The transport system as claimed in claim 1, wherein the carriage comprises a recess in which the spring is received.

3. The transport system as claimed in claim 1, wherein the component is fastened to a spindle of the roller.

4. The transport system as claimed in claim 1, wherein the carriage has multiple rollers, and the guide rail comprises corresponding running surfaces, wherein a contact point of the component with the contact surface during the guided displacement is situated opposite a polygonal region whose corners are formed in each case by a central point of the respective spindles of the rollers.

5. The transport system as claimed in claim 1, wherein the component has multiple contact arms for the electrical contacting.

6. The transport system as claimed in claim 1, wherein the component is in the form of a spring element.

7. The transport system as claimed in claim 1, wherein the contact surface is coated with an electrically conductive layer.

8. The transport system as claimed in claim 1, wherein the component has an antistatic brush.

9. A linear transport system, comprising:
at least one carriage which has at least one permanent magnet and at least one roller,
an energizable stator device which has multiple coils, and
a guide rail which is arranged on the stator device and which serves for guiding the carriage,
wherein the guide rail comprises a running surface for the rolling of the roller of the carriage, such that the roller can roll on the running surface during a displacement, guided by way of the guide rail, of the carriage, wherein at least one electrical contacting device is provided which is formed separately from the roller and which is designed to form an electrical connection between the carriage and the guide rail during the displacement, guided by way of the guide rail, of the carriage,
wherein an electrically conductive contact surface is provided which is electrically connected to the guide rail, wherein the electrical contacting device comprises at least one electrically conductive component which is arranged on the carriage and which is electrically connected to the carriage and which is designed to make electrical contact with the contact surface during the guided displacement, and wherein a fluid barrier device is provided for protecting the contact surface against a fluid flowing on a guide rail surface.

10. The transport system as claimed in claim 9, wherein the fluid barrier device comprises a fluid flow-off device via which a fluid flowing on a rail surface can flow off.

11. The transport system as claimed in claim 9, wherein the fluid barrier device comprises a surface projection of the guide rail surface.

12. The transport system as claimed in claim 11, wherein the surface projection has a dovetail shape, and the contact surface is a surface, which is averted from the guide rail surface, of the dovetail shape.

13. The transport system as claimed in claim 11, wherein the fluid barrier device comprises a strip which is formed separately from the guide rail and which is arranged on the guide rail so as to be spaced apart from the guide rail surface and which is electrically connected to the guide rail, wherein the contact surface is a surface of the strip.

14. A linear transport system, comprising:
at least one carriage which has at least one permanent magnet and at least one roller,
an energizable stator device which has multiple coils, and
a guide rail which is arranged on the stator device and which serves for guiding the carriage,
wherein the guide rail comprises a running surface for the rolling of the roller of the carriage, such that the roller can roll on the running surface during a displacement, guided by way of the guide rail, of the carriage, wherein at least one electrical contacting device is provided which is formed separately from the roller and which is designed to form an electrical connection between the carriage and the guide rail during the displacement, guided by way of the guide rail, of the carriage,
wherein the electrical contacting device comprises an electrically conductive fluid which is applied to a rolling surface, which can roll on the running surface, of the roller and/or to the running surface.

15. A linear transport system, comprising:
at least one carriage which has at least one permanent magnet and multiple rollers,
an energizable stator device which has multiple coils,
a guide rail which is arranged on the stator device and which serves for guiding the carriage,
wherein the guide rail comprises running surfaces for the rolling of the rollers of the carriage, such that the rollers can roll on the running surfaces during a displacement, guided by way of the guide rail, of the carriage,
an electrically conductive contact surface which is electrically connected to the guide rail, and
at least one electrical contacting device which is formed separately from the roller and which is designed to form an electrical connection between the carriage and the guide rail during the displacement, guided by way of the guide rail, of the carriage,
wherein the electrical contacting device comprises at least one electrically conductive component which is arranged on the carriage and which is electrically connected to the carriage and which is designed to make electrical contact with the contact surface during the guided displacement,
wherein a contact point of the component with the contact surface during the guided displacement is situated opposite the geometric center of a polygonal region whose corners are formed in each case by a central point of the respective spindles of the rollers.

16. The transport system as claimed in claim 15, wherein, between the component and the carriage, there is provided a spring for exerting a spring force on the component, such that the component is pressed against the contact surface by way of the spring force during the guidance.

17. The transport system as claimed in claim 16, wherein the carriage comprises a recess in which the spring is received.

18. The transport system as claimed in claim 15, wherein the component is fastened to a spindle of the roller.

19. The transport system as claimed in claim 15, wherein the component is in the form of a spring element.

20. The transport system as claimed in claim 15, wherein the contact surface is coated with an electrically conductive layer.

21. The transport system as claimed in claim 15, wherein the component has an antistatic brush.

22. A method for operating a linear transport system, wherein, during a displacement, guided by way of a guide rail, of a carriage comprising rollers, an electrical contacting device forms an electrical connection between the carriage and the guide rail, wherein the electrical contacting device comprises at least one electrically conductive component which is arranged on the carriage and which is electrically connected to the carriage and which is designed to make electrical contact with the contact surface during the guided displacement, wherein a contact point of the component with a contact surface of a guide rail during the guided displacement is situated opposite the geometric center of a polygonal region whose corners are formed in each case by a central point of the respective spindles of the rollers of a carriage.

* * * * *